April 13, 1954 — W. H. POWERS — 2,675,014
SHOCK ABSORBING CRUTCH TIP
Filed July 3, 1952

William H. Powers
INVENTOR.

Patented Apr. 13, 1954

2,675,014

UNITED STATES PATENT OFFICE 2,675,014

SHOCK ABSORBING CRUTCH TIP

William H. Powers, Tampa, Fla.

Application July 3, 1952, Serial No. 297,087

2 Claims. (Cl. 135—60)

This invention relates in general to crutch tip construction, and more particularly to a crutch tip which includes shock absorbing means.

The primary object of this invention is to provide an improved shock absorbing crutch tip which is provided with shock absorbing means for resisting both upwardly and downwardly movement of the crutch tip with respect to the lower end of an associated crutch.

Another object of this invention is to provide an improved shock absorbing crutch tip which includes a bushing slidably mounted within a sleeve, said bushing being restrained within said sleeve by spring means which acts as a shock absorber and resists upward movement of the bushing with respect to the sleeve.

Another object of this invention is to provide an improved shock absorbing crutch tip construction which is relatively simple and compact and may be easily assembled whereby it is economically feasible.

A further object of this invention is to provide an improved shock absorbing crutch tip construction which includes a bushing slidably mounted within a sleeve, said bushing being cup-shaped and having a downwardly tapered interior whereby the lower end of a crutch may be driven therein into a wedge-fit.

Figure 1:
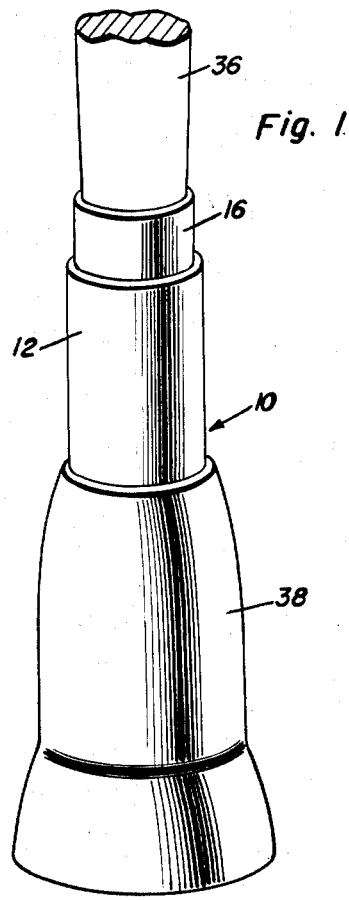
Figure 2:
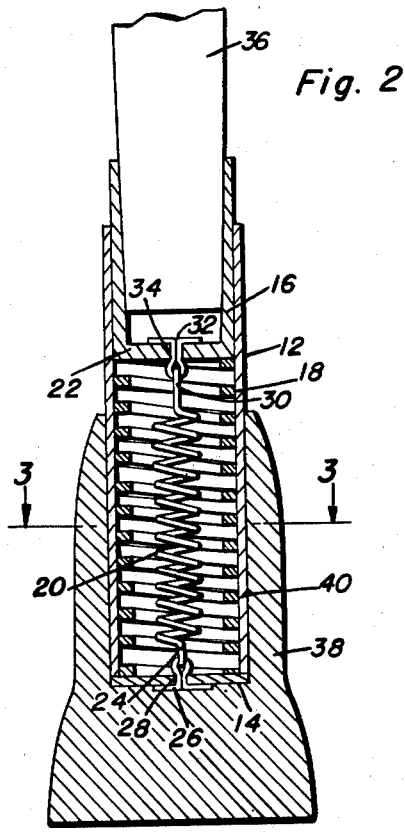
Figure 3:
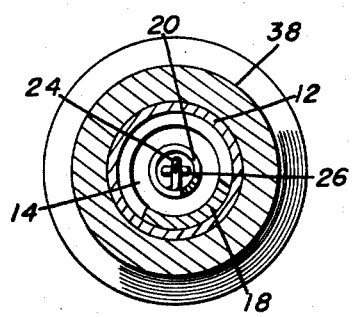

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 1 is an elevational view of the lower end of a crutch having mounted thereon the shock absorbing crutch tip construction, which is the subject of this invention, and shows the general outline thereof;

Figure 2 is a longitudinal vertical sectional view taken substantially along the center line of the tip construction and shows the general relationship of the various elements forming the same; and, Figure 3 is transverse horizontal sectional view taken substantially upon the plane indicated by the section line 3—3 of Figure 3 and shows the arrangements of the various elements of the crutch tip with respect to a sleeve which is the main element thereof.

Similar characters of reference designate similar or identical elements and portions throughout the specification and throughout the different views of the drawings.

Referring now to the accompanying drawings in detail, it will be seen that the shock absorbing crutch tip construction which is the subject of this invention and is referred to in general by the reference numeral 10 includes an elongated sleeve 12 circular in cross section. The lower end of the sleeve 12 is closed by a transversely extending bottom wall 14 and the upper end thereof has slidably mounted therein a cup-shaped bushing 16.

The bushing 16 is supported within the sleeve 12 by a coil spring 18 which is adapted to be compressed by a downward movement of the bushing 16 and engages the underside thereof. The coil spring 18 is supported within the sleeve 12 by having its lower end in engagement with the upper surface of the bottom wall 14 of the sleeve 12.

The bushing 16 is retained within the sleeve 12 by a second coil spring 20 which extends between the bottom wall 14 of the sleeve 12 and a bottom wall 22 of the bushing 16 and is connected thereto. It will be noted that the lower end of the spring 20 has a loop portion 24 received through the eye of a cotter pin 26 and that the legs of the cotter pin 26 pass through a centrally located aperture 28 in the bottom wall 14. The cotter pin 26 is retained within the aperture 28 by bending over the legs thereof so that they are in engagement with the lower surface of the bottom wall 14.

The upper end of the coil spring 20 is provided with a loop 30 which passes through the eye of a cotter pin 32 and is secured thereto. The cotter pin 32 extends upwardly through an aperture 34 in the bottom wall 22 of the bushing 12 and is retained therein by bending the legs of the cotter pin over into engagement with the upper surface of the bottom wall 22.

It will be noted that the interior of the bushing 16 is downwardly tapered and has received therein the lower end of a crutch 36. It will be understood that the taper of the cup-shaped bushing 16 is such that the lower end of the crutch 36 may be driven therein into a wedged-fit.

In order to prevent the wearing of the lower end of the sleeve 12, there is mounted thereon a conventional crutch tip 38. The crutch tip 38 is formed of a resilient material and clampingly receives the lower portion of the sleeve 12 in a centrally located upwardly open cylindrical recess 40 therein. It will be understood that the tip 38 also encloses the lower ends of the cotter pin 26 and gives the lower portion of the crutch tip construction a pleasing appearance.

When the crutch 36 is utilized, downward pressure thereon causes downward movement of the bushing 16 with the resultant compressing of the coil spring 18 whereby the sudden stopping of the lower end of the tip 38 upon striking the ground or other similar surface is absorbed within the coil spring 18. Inasmuch as the bushing 16 is in a lower position when the tip 38 is suddenly moved from the ground, the coil spring 18 has a tendency to suddenly force the bushing 16 upwardly within the sleeve 12 with a resultant jarring action. However, the upward movement of the bushing 16 is resisted by the coil spring 20 so that the upward movement of the bushing 16 is relatively slow and no jarring action results. It will be understood that the coil spring 20 is always under a slight tension to retain the bushing 16 in compressing relation with respect to the coil spring 18 whereby there is no looseness of the various parts forming the shock absorbing crutch tip construction 10.

Although the crutch tip construction 10 has been illustrated and described as being specifically intended for use in connection with the lower end of a crutch, it will be understood that it is not intended to so limit the invention as the tip construction 10 may also be utilized in combination with canes, walking sticks etc.

The operation of this device will be understood from the foregoing description of the details thereof, taken in connection with the above recited objects and drawings. Further description would appear to be unnecessary.

Minor modifications of the device, varying in minor details from the embodiment of the device illustrated and described herein, may be resorted to without departure from the spirit and scope of the invention, as defined in the appended claims.

Having described the invention, what is claimed as new is:

1. A shock absorbing crutch tip comprising an elongated sleeve, a crutch end receiving bushing mounted within the upper portion of said sleeve for vertical sliding movement, a rubber tip member secured over the lower end of said sleeve, shock absorbing means mounted within said sleeve for resisting both upward and downward movement of said bushing, said shock absorbing means including a first spring compressively mounted between a bottom wall of said bushing and a bottom wall across the lower end of said sleeve, a tension spring having ends connected to both of said bottom walls and extending therebetween.

2. A shock absorbing crutch tip comprising an elongated sleeve, a crutch end receiving bushing mounted within the upper portion of said sleeve for vertical sliding movement, a rubber tip member secured over the lower end of said sleeve, shock absorbing means mounted within said sleeve for resisting both upward and downward movement of said bushing, said shock absorbing means including a tension spring extending between bottom walls of said bushing and sleeve and secured thereto for resisting upward movement of said bushing within said sleeve, said bottom walls being provided with centrally located apertures, cotter pins having eye portions receiving end of said spring, said cotter pins extending through said apertures and having legs thereof bent over to prevent movement thereof through said apertures, and a compression spring extending between said bottom walls and surrounding said tension spring.

References Cited in the file of this patent

UNITED STATES PATENTS

| Number | Name | Date |
|---|---|---|
| 1,761,502 | Sullivan | June 3, 1930 |
| 2,414,758 | Moss | Jan. 21, 1947 |

FOREIGN PATENTS

| Number | Country | Date |
|---|---|---|
| 170 of 1889 | Great Britain | Jan. 4, 1889 |